United States Patent
Arakawa

(10) Patent No.: US 12,254,598 B2
(45) Date of Patent: Mar. 18, 2025

(54) INFORMATION PROCESSING APPARATUS AND INFORMATION PROCESSING METHOD

(71) Applicant: CANON KABUSHIKI KAISHA, Tokyo (JP)

(72) Inventor: Mitsuyoshi Arakawa, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 181 days.

(21) Appl. No.: 18/049,997

(22) Filed: Oct. 26, 2022

(65) Prior Publication Data
US 2023/0125752 A1 Apr. 27, 2023

(30) Foreign Application Priority Data
Oct. 27, 2021 (JP) .............................. 2021-175761

(51) Int. Cl.
| | | |
|---|---|---|
| G06T 5/50 | (2006.01) | |
| G06F 3/14 | (2006.01) | |
| G06T 7/50 | (2017.01) | |
| G06T 7/70 | (2017.01) | |
| G06T 15/20 | (2011.01) | |

(52) U.S. Cl.
CPC ............... *G06T 5/50* (2013.01); *G06F 3/14* (2013.01); *G06T 7/50* (2017.01); *G06T 7/70* (2017.01); *G06T 15/20* (2013.01); *G06T 2207/20221* (2013.01)

(58) Field of Classification Search
CPC ......... G06T 15/503; G06T 19/20; G06T 7/70; G06T 5/50; G06T 15/20; G06T 7/50; G06T 2219/2012; G06T 2210/56; G06T 2207/20221; G06T 2210/62; G06T 19/006; G06T 11/60; G06F 3/14; G06F 3/04842; G06F 18/24; G09G 2340/10; G09G 2340/12; G06V 10/764; G06V 10/25; G06V 20/64
See application file for complete search history.

(56) References Cited

U.S. PATENT DOCUMENTS

| | | | |
|---|---|---|---|
| 2002/0126396 A1* | 9/2002 | Dolgoff | H04N 13/395 |
| | | | 359/743 |
| 2021/0290313 A1* | 9/2021 | Cerda-Carvajal | A61B 34/20 |
| 2022/0182625 A1* | 6/2022 | Danielsson | H04N 19/20 |
| 2023/0113741 A1* | 4/2023 | Hayasaka | G06F 3/04847 |
| | | | 345/632 |

FOREIGN PATENT DOCUMENTS

JP 2000149062 A 5/2000

OTHER PUBLICATIONS

Daiki Fujihashi, et al., DEM Simulation of Particle Behavior in Pan-type Pelletizer Considering the Effect of the Capillary Force, J. Soc. Powder Technol., Oct. 2014, Japan.

* cited by examiner

Primary Examiner — Xilin Guo
(74) Attorney, Agent, or Firm — Canon U.S.A., Inc. IP Division

(57) ABSTRACT

An information processing apparatus divides a plurality of objects into objects of interest and objects of non-interest, and generates a projection image of the objects of non-interest integrated into one image and a projection image of the objects of interest. The information processing apparatus composes the projection image of the objects of interest and the projection image of the objects of non-interest, and displays a resultant composed image on a display device.

18 Claims, 6 Drawing Sheets

INFORMATION PROCESSING APPARATUS AND INFORMATION PROCESSING METHOD

BACKGROUND

Field of the Disclosure

The present disclosure relates to an information processing apparatus, an information processing method, and a program.

Description of the Related Art

In an apparatus that constructs a three-dimensional model of a large number of objects in a computer and three-dimensionally displays them, a method is generally used to form a single image as seen from an observer's viewpoint and display the generated image on a display. An example of displaying a large number of objects in such a manner is displaying particles in a powder simulation.

J. Soc Powder Technol. Japan 51, 828-836 (2014) discloses that in particle simulation, particles to be displayed and particles not to be displayed are determined based on the value of each particle such as the diameter of the particle. Japanese Patent Laid-Open No. 2000-149062 discloses a method in which a degree of transparency is set to each object such that objects of interest are distinguished from objects of non-interest thereby making it possible to grasp the position and the posture of an object of interest among a large number of objects.

In order to solve the problem of powder handling in a powder mixing process or the like, it is necessary to grasp a detailed behavior of a powder in an apparatus. However, when only objects of interest are displayed or objects of non-interest are made translucent, it is difficult to simultaneously evaluate the overall behavior of a plurality of objects and the behavior and characteristics of the objects of interest.

SUMMARY

In an aspect, the present disclosure provides an information processing apparatus including a setting unit configured to set one or more objects to be of interest among a plurality of objects as objects of interest, an image generation unit configured to generate a first image representing the objects of interest and generate a second image representing, as one object, objects other than the objects of interest among the plurality of objects, a composition unit configured to compose the first image and the second image, and an output unit configured to output a composed composite image.

In an aspect, the present disclosure provides an information processing method including setting one or more objects to be of interest among a plurality of objects as objects of interest, generating a first image representing the objects of interest and generating a second image representing, as one object, objects other than the objects of interest among the plurality of objects, composing the first image and the second image, and outputting a composed composite image.

Further features of the present disclosure will become apparent from the following description of exemplary embodiments with reference to the attached drawings.

DESCRIPTION OF THE EMBODIMENTS

Figure 1:
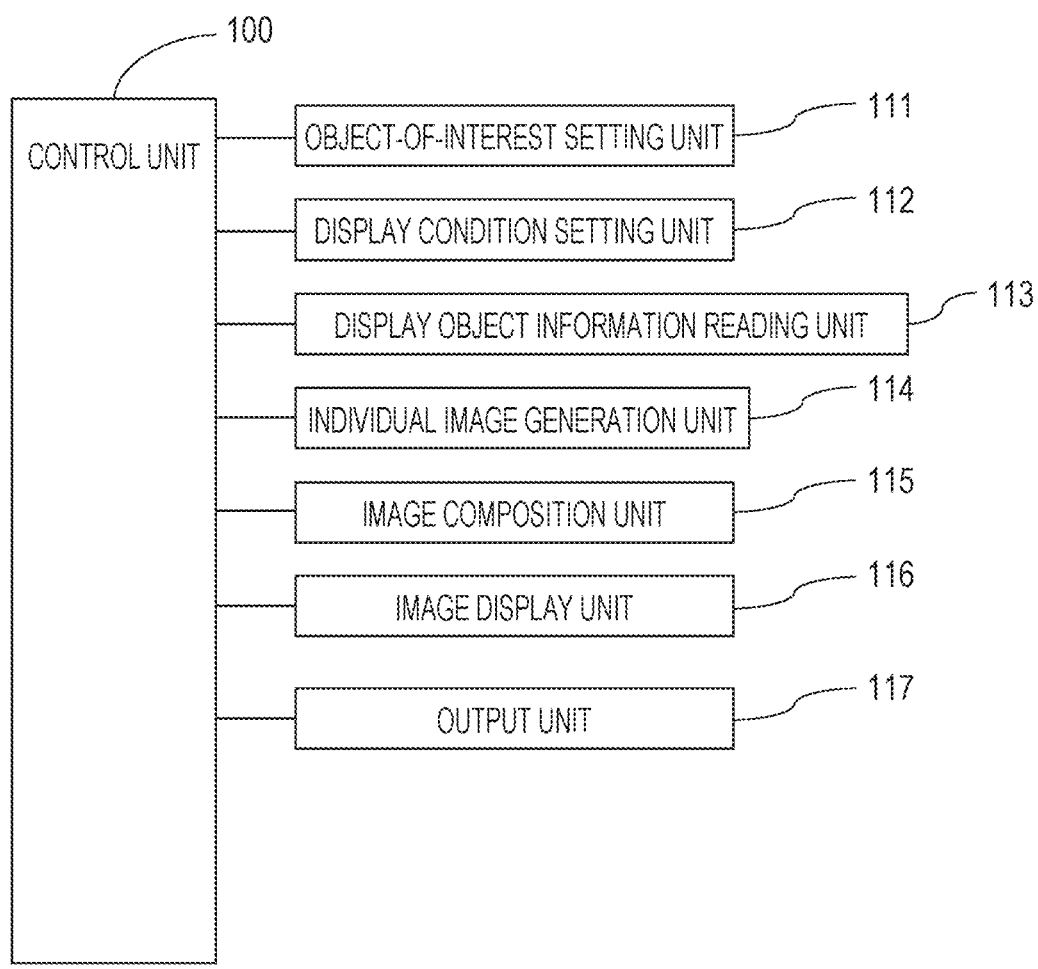
FIG. 1 is a diagram showing an example of a functional configuration of an information processing apparatus according to one or more aspects of the present disclosure.

Embodiments of the present disclosure are described below with reference to the drawings.

First Embodiment

Some production processes for products such as medical/pharmaceutical products, toners, or the like that are produced using powders include a process of conveying the powders and/or a process of mixing the powders to make the products uniform.

For example, the production process of tablets includes a process of mixing small-diameter active pharmaceutical ingredients and large-diameter excipients. In order to make the tablet uniformly include medical ingredients, it is desirable that the two types of powder are made uniformly distributed over the entire powder layer in the mixing process. A particle simulation is effectively used to analyze mixing phenomena in production processes. In this specification, in a simulation for observing the behavior of a plurality of (a large number of) objects, one or more objects of interest among the plurality of objects are referred to as the objects of interest, and the other objects are referred to as objects of non-interest. Hereinafter, when a specific particle is selected as an object of interest, this particle will be referred to simply as a particle of interest.

For example, one of powder handling techniques is a mixing process for uniformly mixing a plurality of types of powder. In a case where the degree of mixing is insufficient, it is necessary to change the shape of a container or a stirring member. However, in a case where it is unknown along what kind of trajectory the particles of interest move in the apparatus, and/or how particles and the like are mixed in the powder layer, It is difficult to properly establish a guideline for which part of the shape of the container or the stirring member is to be modified to improve the mixing performance. That is, in the powder handling, it is important to know where in the entire powder layer the particles of interest are located. However, in many cases, the powders are not transparent, and a plurality of mixed powders has the same color. Therefore, it is difficult to confirm the positions of the particles of interest in the powder layer, which change from moment to moment. In view of the above, attempts have been made to analyze the behavior of an arbitrary particle in a powder layer using the particle simulation.

Methods for displaying the behavior of an object of interest among a plurality of objects have been proposed. However, these methods have several problems. For example, in a method of determining which particles are to be displayed and which particles are not to be displayed based on values of each particle, particles other than the particles of interest are not displayed, and thus it is difficult to identify where in the whole powder layer the particles are located.

In a method in which the particles of non-interest are displayed with the degree of transparency set thereto thereby making it possible to display where in the whole powder layer the particles of interest are located, all the particles to which the degrees of transparency are set are superimposed when they are displayed. Since the color displayed on the display is determined by the degree of transparency and the thickness (the optical path length) of the object, the degrees of transparency of particles of non-interest change depending on the number of particles overlapping in the depth direction when the powder layer of interest is viewed from the observer's viewpoint. Therefore, in a portion where there is a small amount of powder in the depth direction, such as an interface, an edge of the container, and the like, the degree of transparent becomes higher than in an inner portion. As a result, blurring occurs at the interface which plays an important role in the feature of the overall powder layer behavior. Furthermore, the display color of the particles of interest changes depending on whether the transparentized particles of non-interest are located in front of or behind the particles of interest as viewed from the observer's viewpoint. In displaying the result of simulating the behavior of the powder particles, the color information of the powder particles is important information indicating the characteristics of the particles. For example, in a case where the color of a particle represents the temperature of the particle, it is necessary to appropriately display the color of the particle of interest. However, in the case where the degree of the transparency is set to the particles of non-interest and the particles are simply displayed, it is difficult to appropriately display the color representing the temperature.

In view of the above, the present disclosure provides a technique for observing the behavior of a plurality of objects such as powders such that the overall behavior of the plurality of objects and the behavior and characteristics of the object of interest both can be observed at the same time with high accuracy.

Functional Configuration for Displaying Behavior of Object of Interest Among a Plurality of Objects FIG. 1 is a diagram showing an example of a functional configuration of an information processing apparatus 10 for displaying behaviors of a plurality of objects. A control unit 100 controls the entire process of dividing a plurality of objects into objects of interest and objects of non-interest, generating a projection image in which the objects of non-interest are integrated into one, and displaying an image obtained by composing the projection image of the objects of interest and the objects of non-interest. The control unit 100 includes an object-of-interest setting unit 111, a display condition setting unit 112, a display object information reading unit 113, an individual image generation unit 114, an image composition unit 115 and an image display unit 116.

The object-of-interest setting unit 111 sets an ID associated with the object of interest, an attribute of the object, and information on a threshold value for determining the object of interest such that they are set in a memory as object-of-interest data 201b.

The object-of-interest data 201b may be set by being input by a user, or may be set based on information determined in advance according to the material of the object, etc., or based on past simulation data. The object of interest is, for example, a plurality of particles of interest among a large number of particles. The object-of-interest setting unit 111 acquires information indicating objects of interest among a plurality of objects, and sets them as objects of interest.

The display condition setting unit 112 sets conditions for displaying the objects of interest and the objects of non-interest in a memory as the display condition data 201c. The display condition data 201c includes data relating to the contents to be displayed on the display unit, such as displaying order of the objects of interest and the objects of non-interest, attribute information that determines the degree of transparency, the display color, etc. The display condition data 201c may be set by being input by a user, or may be set based on information determined according to the material of the object, etc., or based on past simulation data. The display condition setting unit 112 sets conditions for acquiring information indicating the manner of displaying the objects of interest and the objects of non-interest.

The display object information reading unit 113 sets, in the memory, information indicating the value of the ID uniquely assigned to each object as object ID data 201d, information indicating the shape of each object as object shape data 201e, information indicating the posture of each object as object posture data 201f, information indicating the position of each object as object coordinate data 201g, and information indicating the attribute of each object as object attribute data 201h. The object ID data 201d includes ID data indicating a numeric value identifying each object. The object shape data 201e includes data on shapes of particles, a container, a stirring members, and the like. The object shape data 201e may be set by being input by a user, or may be set based on CAD data, or may be set based on past simulation data. The object posture data 201f includes data indicating in what direction and how much the object is tilted with respect to the shape registered in the object shape data 201e. The object coordinate data 201g includes coordinate information indicating where, in the space, vertices and the center of gravity of the object indicated by the object shape data 201e are currently located. The object posture data 201f and the object coordinate data 201g may be set by the CPU 200 by performing a simulation (a process of estimating the behavior of the objects and obtaining the coordinates and postures of the objects), or may be set by acquiring results of calculations performed by a workstation (not shown) connected via the bus 205 or a LAN interface (not required). The object attribute data 201h includes values related to the shape or physical properties of the objects such as particle diameters, specific gravities, and rigidities, and data on physical quantities such as velocities, acting forces, temperatures, amounts of electric charge, and amounts of magnetization of objects. The object attribute data 201h may be set by being input by a user, or may be set based on information determined in advance according to the material of the object, etc., or based on past simulation data. The display object information reading unit 113 is an example of an acquisition unit that acquires information indicating coordinates indicating the shapes, postures, and positions of objects.

The individual image generation unit 114 generates each of an image of objects of interest and an image of objects of non-interest, based on the object-of-interest condition data 201b set by the object-of-interest setting unit 111, the display condition data 201c set by the display condition setting unit 112, and the object ID data 201d, the object shape data 201e, the object posture data 201f, the object coordinate data 201g, and object attribute data 201h set by the display object information reading unit 113. The individual image generation unit 114 generates a projection image as seen from a certain viewpoint. The individual image generation unit 114 is an example of the image generation unit that generates the first image representing the objects of interest. The individual image generation unit 114 is also an example of the image generation unit that generates the second image representing, as one object, objects other than the objects of interest among the plurality of objects. In generating the first image and the second image, the individual image generation unit 114 receives settings for the mode in which the objects are displayed in the image to be generated from the viewpoint based on the various data described above.

The image composition unit 115 generates a composite image based on the image of the objects of interest and the objects of non-interest set by the individual image generation unit 114 and the display condition data 201c. In order to effectively display the behavior of the particles of interest in the overall behavior, the image composition unit 115 may generate the composite image such that the particles of interest are displayed in a display mode different from a display mode in which the particles of non-interest are displayed. The display mode is, for example, the degree of transparency of each image. That is, the image composition unit 115 may generate the composite image such that the degree of transparency of the image of the particles of interest is different from that of the image of the particles of non-interest. The image composition unit 115 composes the image of the particles of interest and the image of the particles of non-interest in a predetermined display order based on the display condition data 201c. The image composition unit 115 is an example of the composition unit that composes the first image and the second image. In composing the images, the image composition unit 115 receives settings for the mode of the composition from the viewpoint based on the display condition data 201c. Details of processing performed by the individual image generation unit 114 and the image composition unit 115 will be described later.

The image display unit 116 causes the image generated by the image composition unit 115 to be displayed on a display unit. The image display unit 116 simultaneously displays the overall behavior of the plurality of objects and the behavior and characteristics of the objects of interest on the display unit. The image display unit 116 is an example of the output unit that performs outputting by displaying the composite image on the display unit.

The output unit 117 outputs a file containing the composite image generated by the image composition unit 115 to the external storage apparatus 204 or an apparatus connected to the information processing apparatus 10 via the bus 205 or a LAN interface (not shown). The data format of the file is not limited to this, and the file may include, for example, a part or all of various programs and data 201a to 201h stored in the RAM 201. The output unit 117 is an example of the output unit that outputs the file including the composite image.

Figure 2:
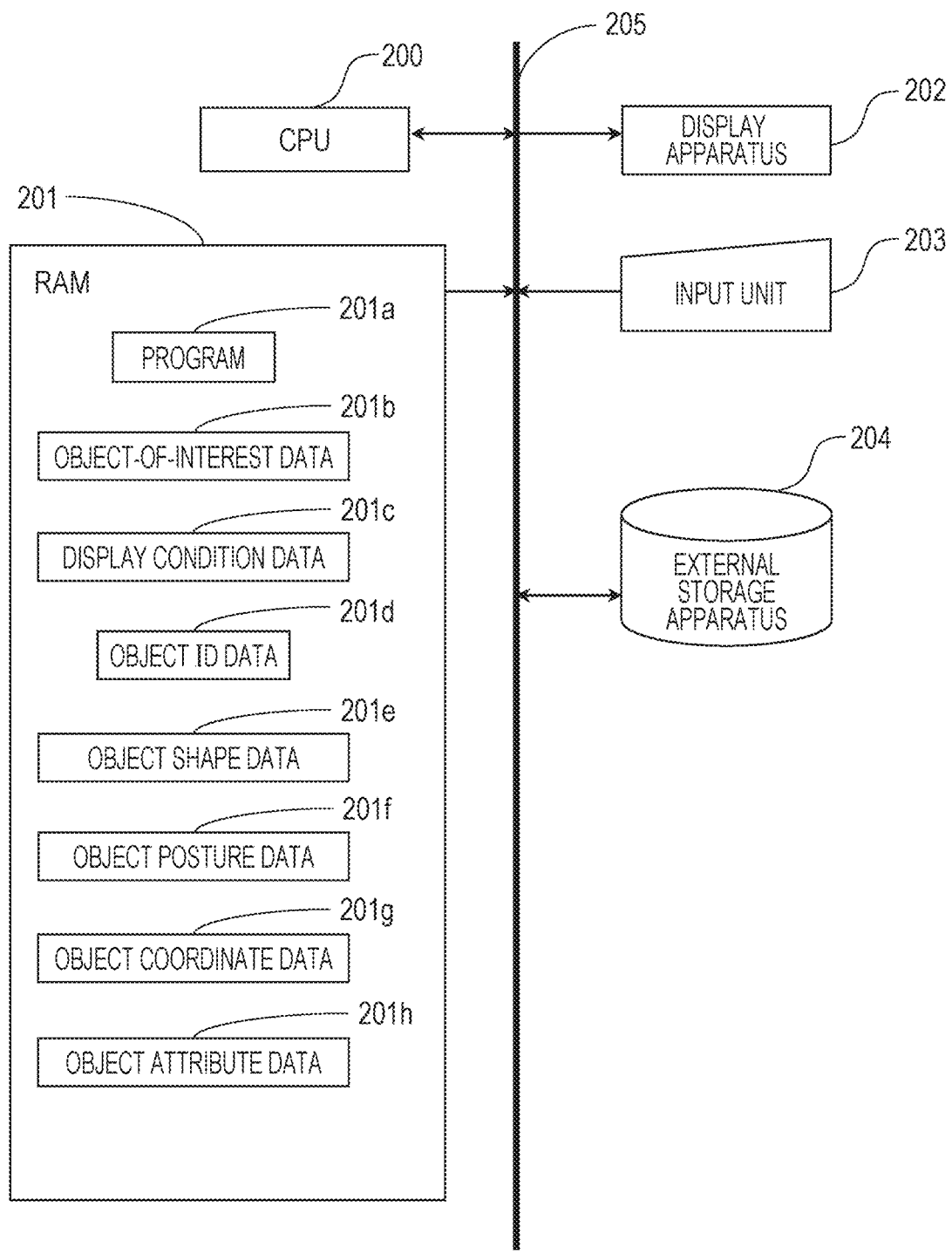
FIG. 2 is a diagram showing an example of a hardware configuration of an information processing apparatus according to one or more aspects of the present disclosure.

Hardware Configuration of Information Processing Apparatus 10 for Displaying Behavior of Objects of Interest Among Plurality of Objects FIG. 2 shows an example of a hardware configuration of the information processing apparatus 10 for displaying the behavior of a plurality of objects. The information processing apparatus 10 includes at least a CPU (Central Processing Unit) 200 and a RAM (Random Access Memory) 201, and is connected to a display apparatus 202, an input unit 203, and an external storage apparatus 204 via a bus 205. The information processing apparatus 10 may include a GPU (Graphics Processing Unit), a ROM (Read Only Memory), a LAN (Local Area Network) interface, an HDD (Hard Disk Drive), an SSD (Solid State Drive), and the like (which are not shown).

The RAM 201 stores, for example, a program 201a for generating an image representing the behavior of a plurality of objects, object-of-interest data 201b, display condition data 201c, object ID data 201d, object shape data 201e, object posture data 201f, object coordinate data 201g, and object attribute data 201h.

The CPU 200 and the GPU are each an example of a processor. The RAM 201, the ROM, the HDD, and the SSD are each an example of a memory. The information processing apparatus 10 may include a plurality of processors. Various kinds of processing are executed by the processor in the information processing apparatus 10 by executing programs stored in the memory. The information processing apparatus 10 may also include a CPU, a GPU, or an ASIC (Application Specific Integrated Circuit) that exclusively performs specific processing. The information processing apparatus 10 may include an FPGA (Field-Programmable Gate Array) in which specific processing or all processing is programmed. The information processing apparatus 10 may have a plurality of configurations of memories. The information processing apparatus 10 may include a plurality of components for communication such as the bus 205, the LAN interface, and the like.

The display apparatus 202 is configured to display an interface for inputting various kinds of information indicating a mode of displaying the overall behavior of the plurality of objects and the behavior and characteristics of the objects of interest, and display an image representing the overall behavior of the plurality of objects and the behavior and characteristics of the objects of interest. The display apparatus 202 is, for example, a liquid crystal display. The input unit 203 is configured to be used by a user to input information to the information processing apparatus 10. The input unit 203 is, for example, a keyboard, a mouse, or the like. The display apparatus 202 and the input unit 203 may be integrated as a touch panel display. The display apparatus 202 is an example of the display unit. An external display apparatus (not shown) that displays the overall behavior of the plurality of objects and the behavior and characteristics of the objects of interest based on an image file output from the information processing apparatus 10 via the bus 205 or the LAN interface is also an example of the display unit.

Figure 3:
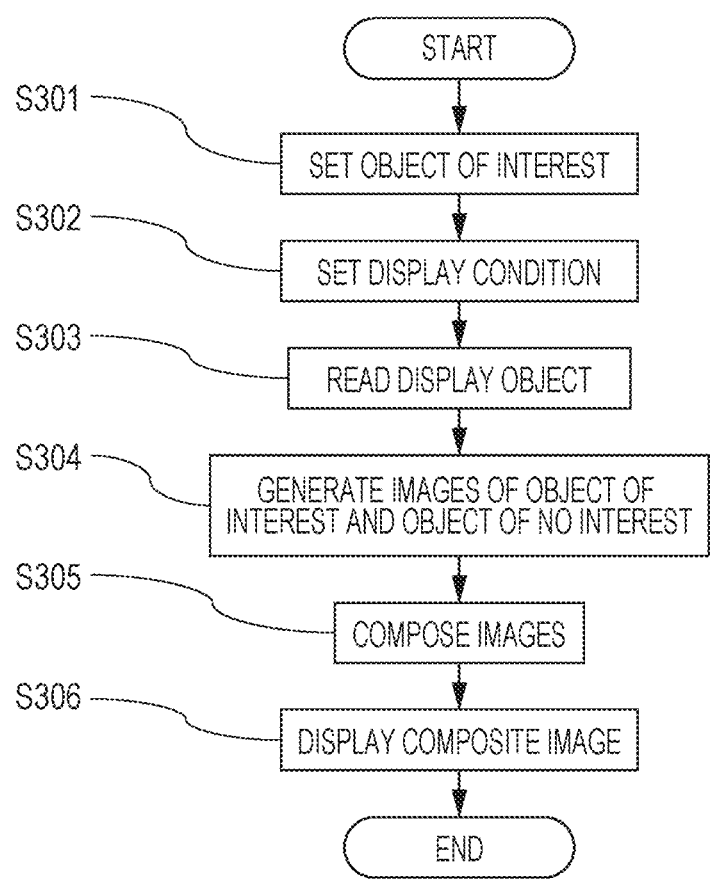
FIG. 3 is a flowchart showing an example of information processing according to one or more aspects of the present disclosure.

In the first embodiment, the CPU 200 performs a particle simulation (a process of calculating the behavior of particles included in powder) based on various conditions stored in the RAM 201. The particle simulation may be performed by a GPU (not shown), or by a workstation (not shown) connected via the bus 205 or the LAN interface, or may be performed by the CPU 200 in cooperation with one of or all of these devices. Processing of generating and displaying an image representing the behavior of objects of interest among a plurality of objects FIG. 3 is a flowchart showing an example of information processing of generating an image representing the behavior of objects of interest among a plurality of objects and displaying the generated image on the display unit. FIGS. 4A to 4H are diagrams for explaining an example of processing of generating the image displayed on the display unit. FIGS. 5A to 5E are diagrams for explaining examples of images displayed on the display unit. The process of generating the image representing the behavior of objects of interest among a plurality of objects and displaying the generated image on the display unit is described below with reference to FIGS. 3, 4A to 4H, and 5A to 5E.

In step S301, the object-of-interest setting unit 111 sets the object-of-interest data 201b in the RAM 201. In the first embodiment, an example is described in which a large number of particles are filled in a cylindrical container and some of the particles are displayed. In the first embodiment, a particle of interest is identified by a particle ID which is a number uniquely assigned to each particle. The information set here is stored as object-of-interest condition data 201b.

In step S302, the display condition setting unit 112 sets the display condition data 201c in the RAM 201. In the first embodiment, by way of example, the particles of interest are displayed in the same color on the front side, and the particles of non-interest are displayed on the back side in a color different from that of the particles of interest. The information set here is stored as the display condition data 201c. Depending on the situation, from the viewpoint of displaying the image such that a user can easily grasp the image, it may be desirable that the particles of non-interest are made transparent and they are displayed on the front side. Thus, depending on the content of the problem or the purpose, the user may properly set the displaying order and the degrees of transparency of the particles of interest and the particles of non-interest. This makes it possible to evaluate the behaviors of many objects depending on the problem or the purpose.

In step S303, the display object information reading unit 113 reads the information on the objects to be displayed, and sets the object ID data 201d, the object shape data 201e, the object posture data 201f, the object coordinate data 201g, and the object attribute data 201h in the RAM 201.

In step S304, the individual image generation unit 114 generates an image of the objects of interest and an image of the objects of non-interest based on the contents set in steps S301, S302, and S303.

In step S305, the image composition unit 115 generates an image to be displayed on the display apparatus 202 based on the images of the objects of interest and the objects of non-interest generated in step S304 and the display condition data 201c. Details of processes in steps S304 and S305 will be described later.

In step S306, the image display unit 116 causes the display apparatus 202 to display the image generated by the image composition unit 115. Here, the output unit 117 may output, according to an instruction issued by an operator or automatically, the file to the external storage apparatus 204 or a different apparatus connected to the information processing apparatus 10 via the bus 205 or a LAN interface (not shown). The file includes, for example, the composite image generated in step S305.

Figure 4A:
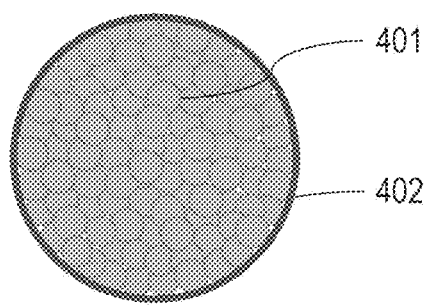
FIGS. 4A to 4H are diagrams showing a method of generating a display image according to one or more aspects of the present disclosure.
Figure 4E:
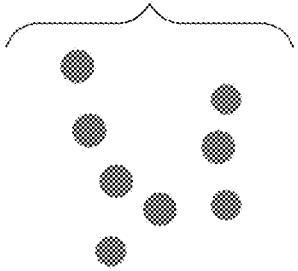
Figure 4B:
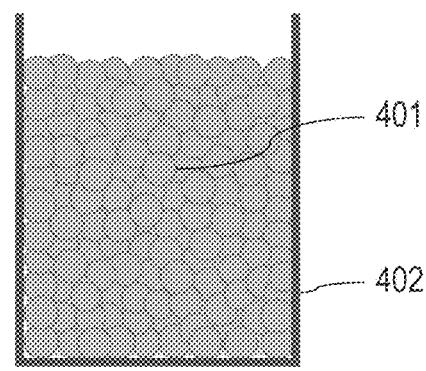
Figure 4F:
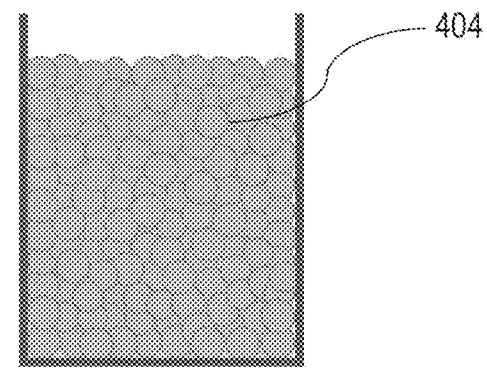
Figure 4C:
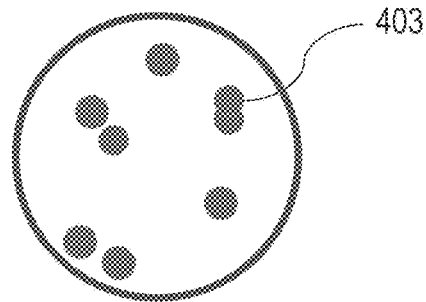
Figure 4G:
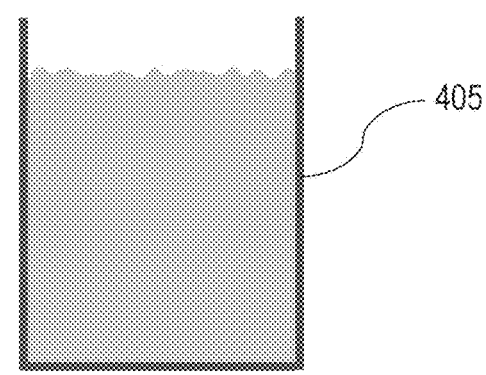
Figure 4D:
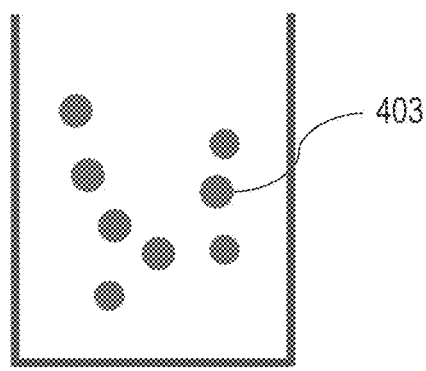

The details of the processes in step S304 and step S305 are described below. FIGS. 4A to 4H are diagrams illustrating a method of generating a display image representing particles of interest according to the first embodiment. Here, the method is described by way of example for a case where particles of interest in a powder filled in a cylindrical container are displayed. FIGS. 4A and 4B illustrate a state in which particles are filled in a cylindrical container, wherein FIG. 4A is a top view observed from above the cylindrical container, and FIG. 4B is a side view observed from a direction from bottom to top in FIG. 4A. In FIGS. 4A and 4B, reference numeral 401 denotes particles, and reference numeral 402 denotes the cylindrical container. In this embodiment, it is assumed that the container is colorless and transparent, and the particles filled in the container are completely visible from the side of the container. FIGS. 4C and 4D are diagrams showing only the particles of interest located in the cylindrical container. FIG. 4C is a top view observed from above the cylindrical container, and FIG. 4D is a side view observed from a direction from bottom to top in FIG. 4C. In FIGS. 4C and 4D, reference numeral 403 denote the particles of interest which are located in the powder layer. Among the particles of interest 403, some particles are located close to the wall surface of the container 402 while some particles are located far from the wall surface of the container 402. In FIGS. 4C and 4D, the outline and the shape of the cylindrical container are visibly described for the sake of explanation, but the cylindrical container may not be displayed in the image of the particles of interest.

In the first embodiment, the information processing apparatus 10 classifies a plurality of objects to be displayed into objects of interest and objects of non-interest, generates respective images thereof, and then composes the images into one image to be displayed on the display apparatus 202. In a specific example described here, the particles of interest 403 are set as the objects of interest, and the container and particles that are included in the particles 401 but not included in the particles of interest 403 are set as the objects of non-interest, and an image is generated which is observed in a direction from bottom to top in FIG. 4A.

In step S304, the individual image generation unit 114 sets the particles of interest 403 as the objects of interest based on the conditions set in steps S301, S302, and S303. The other particles and the container are set as the objects of non-interest. FIGS. 4E and 4F are diagrams in which a plurality of objects constituting the powder or the like are separated into the objects of interest and the objects of non-interest. Reference numeral 404 denotes the particles other than the particles of interest. FIG. 4G is a diagram showing a projection image of the objects of non-interest. In FIG. 4G, reference numeral 405 denotes the image of the objects of non-interest. In FIG. 4F, the objects of non-interest include the plurality of particles 404 and the container 402. However, the projection image 405 is generated such that the particles 404 and the container 402 are integrated as one object, and the image of the objects of non-interest is given by the generated projection image 405. FIG. 4F can be regarded as a projection image in which all objects other than the objects of interest (the particles of interest) among the plurality of objects are represented as one object.

Figure 4H:
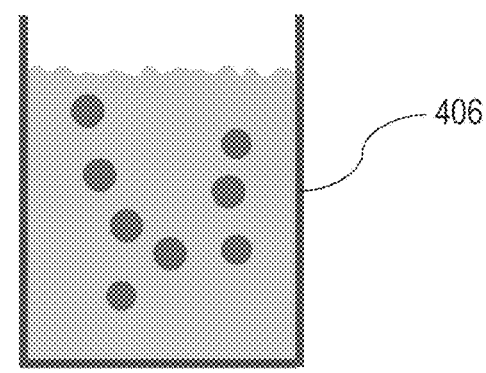

In step S305, the image composition unit 115 generates an image to be displayed on the display apparatus 202 based on the image of the objects of interest and the image of the objects of non-interest generated in step S304 and the display condition data 201c. FIG. 4H is a diagram showing a final image to be displayed on the display apparatus 202. Reference numeral 406 denotes a composite image of the image of the objects of interest and the image of objects of non-interest. In the present embodiment, the image 404 of the objects of non-interest is the rearmost view, and the particles of interest 403 are sequentially projected onto the front of the image 404 in the observation direction from back to front. In the above-described manner, the composite image 405 of the objects of interest and objects of non-interest is generated.

Figure 5A:
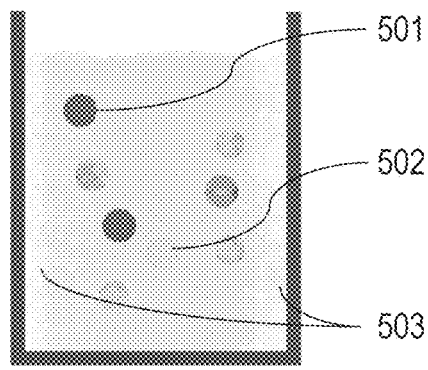
FIGS. 5A to 5E are diagrams for explaining an example of a display method according to one or more aspects of the present disclosure.
Figure 5D:
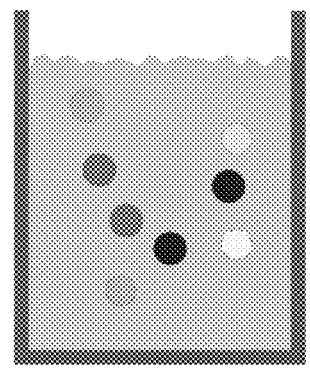
Figure 5B:
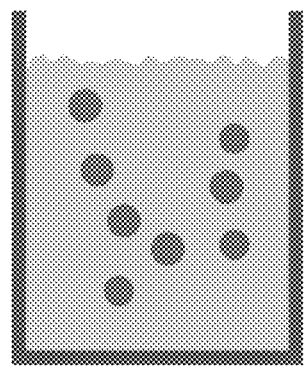

FIGS. 5A to 5E are diagrams showing examples of displaying particles of interest. FIG. 5A shows an example of a conventional manner of displaying particles. FIG. 5B shows an example of a manner of displaying particles according to the first embodiment. Referring to FIG. 5A, as an example of a general conventional technique, a method of displaying particles is described in which particles of non-interest are made transparent. In FIG. 5A, reference numerals 501 and 502 denote particles of interest, and reference numeral 503 denotes particles of non-interest located in the vicinity of the wall surface. In the conventional method, transparentized particles of non-interest overlap in the displayed image, and thus the displayed density of particles of non-interest changes depending on the location in the container. As a result, two problems occur. A first problem is that the appearance of the particles of interest changes depending on the number of particles of non-interest located in front of the particles of interest. For example, when particles are located on a front side in the observation direction of interest, such as the particle of interest 501, they are displayed in an originally set color. However, in a case where particles of interest, such as the particle of interest 502, are located on a far side in the observation direction and many particles of non-interest exist in front of them, the displayed color changes from the originally set color, and they are hardly visible. A second problem is that the particles of non-interest 503 located in the vicinity of the side surface of the container are displayed lighter than those located in the central portion, and the visibility of the interface, which is important information for the overall particle distribution, is degraded. Therefore, in the conventional method, it is difficult for a user to simultaneously observe how the overall particle flow is and how the particles of interest move in the overall particle flow. FIG. 5B is a diagram showing an example of a result of displaying according to the present embodiment. This method according to the present embodiment makes it possible to accurately confirm the colors and positions of the particles of interest, and also possible to clearly confirm the distribution of particles of non-interest located near the container. This allows the user to simultaneously and accurately observe the overall behavior of the plurality of objects and the behavior and characteristics of the objects of interest.

Modification of the First Embodiment

The methods of displaying an object of interest among a plurality of objects is not limited to the examples described above.

Figure 5E:
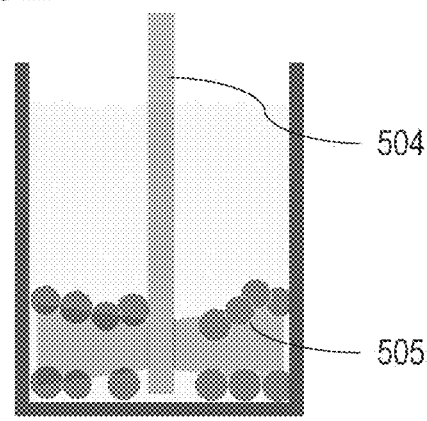
Figure 5C:
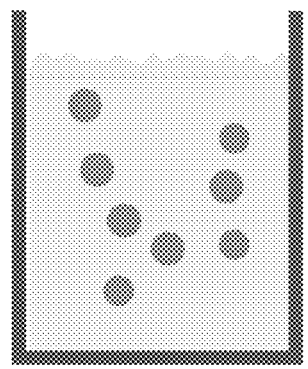

FIG. 5C shows an image obtained by setting the degree of transparency of the image 405 of the objects of non-interest such that the image is translucent, placing it not in the rearmost position as the first embodiment but on the front side, and composing it with the image of the particles of interest 403. As a result, although the color of the particles of interest 403 is different from the color of the particles of interest shown in FIG. 5B, the positions of all the particles can be properly confirmed. This may provide a more intuitive and easy-to-understand representation of the behavior of an object of interest in many objects of non-interest. As can be seen from the above discussion, the display order and the degrees of transparency of the objects of interest and objects of non-interest are not limited to the above-described methods according to the embodiments, and the user may select a suitable method from the viewpoint of the purpose of displaying and the visibility.

FIG. 5D shows an example in which the physical quantities of the particles of interest are reflected in the display colors. For example, when information on the particle temperature is important, the particle temperature obtained by simulation or the like may be stored in the object attribute data 201*h*, and the temperature of the particle of interest may be displayed by the display color. The display color of the object of interest may be determined based on values related to the shape and physical properties of the object such as the particle diameter, the specific gravity, the rigidity and/or the like, and physical quantities such as the speed, the acting force, the temperature, the amount of charge, and the amount of magnetization obtained in the process of object behavior. When it is desired to display a vector value such as a velocity, a vector associated with the object of interest may be simultaneously displayed together with the color of the object.

FIG. 5E shows an example in which not only the particle of interest is displayed but also the positional relationship between the stirring member and the particle of interest is displayed. In FIG. 5E, reference numeral 504 denotes a stirring member, and reference numeral 505 denotes particles receiving a strong shearing force. The particles in the container 402 are mixed by the stirring member 504, and the particle 505 receiving the strong shearing force changes from moment to moment in the process. In the embodiment described above, the objects of interest include only particles, but in the case where the positional relationship between the particles and other members is important, the particles of interest 505 and the stirring member 504 shown in FIG. 5E may be set as the objects of interest and the degree of transparency may be set to the stirring member thereby achieving the displaying of them in the desired manner. As described above, it is not necessary to limit objects of interest to only particles, and all objects of interest may be selected. In the present example, the degree of transparency is set only for the stirring member, but the degree of transparency and display order may be set to each of all objects of interest thereby making it possible to select a suitable displaying mode according to the user's purpose and the viewpoint of visibility. In a case where the particles of interest are particles that are subjected to a strong shearing force as in the present example, the shear force applied to the particles may be obtained by a simulation or the like and stored in the object attribute data 201*h*, and a threshold value may be set for the shear force, and the objects of interest may be changed from frame to frame in the image (moving image) according to the threshold value. The objects of interest may be specified based on values relating to the shape and physical properties of the objects, such as the particle diameter, the specific gravity, the rigidity, and/or the like. Alternatively, the objects of interest may be specified based on physical quantities such as the coordinates of the objects at each point of time, the paths along which the objects have moved, the velocity, the acting force, the temperature, the amount of charge, the amount of magnetization, etc., determined in the process of the behaviors of the objects.

In the above-described example, the composite image is displayed on the display apparatus 202, but the present disclosure is not limited to this example. For example, the image display unit 116 may cause the display apparatus 202 to display a moving image composed of a plurality of frames of composite images. The image display unit 116 may cause the display apparatus 202 to display, side by side in addition to the above composite image, another composite image generated in a different display order or another composed image in which the degree of transparency is changed at least for one of the object of interest and the object of non-interest. In a case where the image display unit 116 causes the display apparatus 202 to display a plurality of different composite images or moving images, the images or the moving image may be switched in a predetermined time. In a case where a plurality of different types of moving images are displayed side by side on the display apparatus 202, the image display unit 116 may display these moving images while synchronizing time among the moving images. This makes it possible to observe the behaviors of the plurality of objects from various viewpoints.

From the viewpoint of generating a moving image, displaying it, or outputting it to a file, an image representing particles of interest may be called a first three-dimensional moving image. Similarly, an image that collective represents objects other than the objects of interest among a plurality of objects may be called a second three-dimensional moving image. The individual image generation unit 114 generates a moving image that is a projection image of the moving image representing the particles of interest from a first viewpoint (this image may be called a first projection moving image). Similarly, the individual image generation unit 114 generates a moving image that is a projection image of the moving image representing the particles of non-interest from the first viewpoint (this image may be called a second projection moving image). When the composite image is generated, the moving image representing the particles of interest is represented with a first degree of transparency and the moving image representing the objects of non-interest is represented with a second degree of transparency. The image display unit 116 may display the projection image on the display apparatus 202 such that the viewpoint of the projection image is switched according to an instruction given by a user or automatically at predetermined time intervals.

Second Embodiment

In the displaying method disclosed in the first embodiment described above, all objects other than the objects of interest are treated as objects of non-interest. In a second embodiment described below, a displaying method is disclosed in which objects other than the objects of interest are classified into a plurality of objects of non-interest. An image representing behaviors of a plurality of objects may be generated in a similar manner to the first embodiment, and thus a further description thereof is omitted here.

Figure 6A:
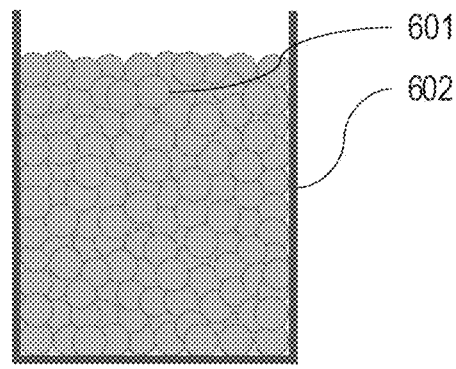
FIGS. 6A to 6E are diagrams for explaining an example of a display method according to one or more aspects of the present disclosure.
Figure 6D:
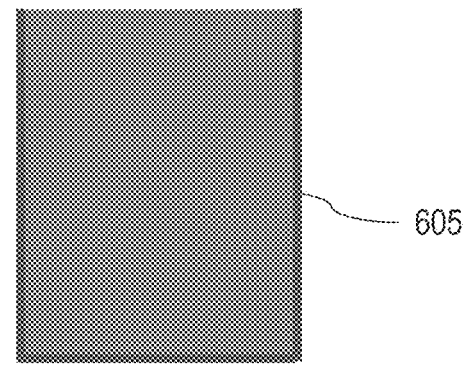
Figure 6B:
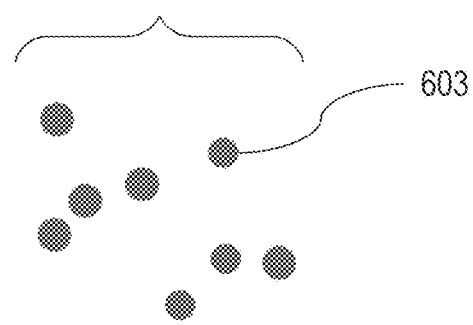
Figure 6E:
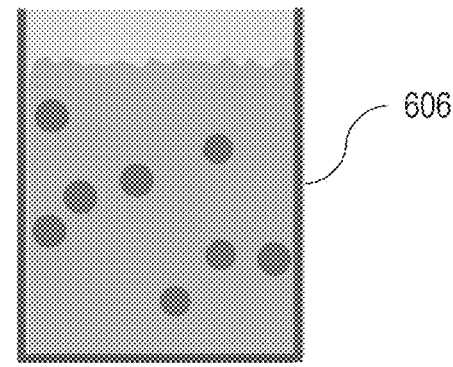
Figure 6C:
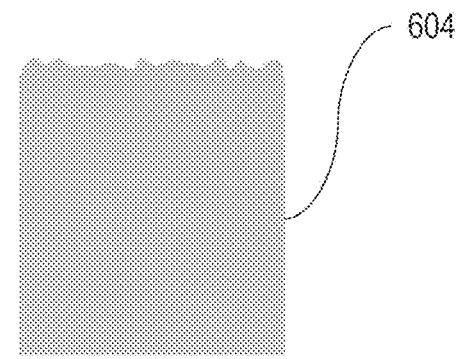

FIGS. 6A to 6E are diagrams for explaining the second embodiment. FIG. 6A is a side view of a cylindrical container filled with a powder to be displayed. Reference numeral 601 denotes particles, and reference numeral 602 denotes the container. Although the container 602 is transparent in FIG. 6A as in the first embodiment, in the displaying method according to the second embodiment described below, the container 602 is opaque. In this case, when observed from the side, the particles 601 inside the container are not visible at all, and only the container 602 is visible. Here, if the container and the objects of non-interest defined by particles other than the particles of interest are displayed transparently, since the particles other than the particles of interest are displayed transparently, a problem occurs that it is impossible to know the behavior of the powder as a whole. In view of the above, in the second embodiment, by way of example, a plurality of objects of non-interest are set such that the particles other than the particles of interest are set as first objects of non-interest and the container is set as a second object of non-interest. FIGS. 6B to 6D show images generated by the individual image generation unit 114. FIG. 6B shows a projection image 603 of the particles of interest. FIG. 6C shows a projection image 604 of the particles other than the particles of interest, that is, the first objects of non-interest. FIG. 6D shows a projection image 605 of the container, which is the second object of non-interest. The projection image 603 is an example of an image (a first image) of the particles of interest. The image of the first objects of non-interest is an example of the second image. The image of the second objects of non-interest is an example of a third image that is an image of objects of non-interest which are not included in the second image. As described above, the individual image generation unit 114 generates three images, and the image composition unit 115 composes these three images. FIG. 6E shows an example of a result of processing performed by the image composition unit 115. Reference numeral 606 denotes an image obtained as a result of composing the image 603 of the objects of interest, the image 604 of the first objects of non-interest, and the image 605 of the second objects of non-interest.

In this example, the image composition unit 115 composes images such that the image 604 of the first object of non-interest is placed at the backmost position, the image 603 of the object of interest is placed in front of the image 604, and the image 606 of the second object of non-interest is made translucent with a set degree of transparency and placed in the frontmost position, and these images are superimposed. This method makes it possible to objectively evaluate the behavior of an object of interest among a plurality of objects in a state where objects of non-interest, which are objects other than the object of interest, include a mixture of various types of objects.

Other Embodiments

The present disclosure may also be implemented by providing a program for realizing one or more functions of the embodiments to a system or an apparatus via a network or a storage medium, and reading out and executing the program by one or more processors in a computer disposed in the system or the apparatus. The present disclosure may also be implemented using a circuit (for example, an ASIC) for realizing one or more functions of the embodiment.

The information processing apparatus 10 according to each of the above-described embodiments may be implemented as a single apparatus, or as a combination of a plurality of apparatuses capable of communicating with each other and the process may be executed cooperatively by the plurality of apparatuses. Any case falls within the scope of the present disclosure. The process may be executed by a common server apparatus or a group of servers. The plurality of apparatuses constituting the information processing apparatus 10 or the information processing system do not need to be located in a same facility or in a same country as long as the plurality of apparatuses are capable of communicating with each other.

Embodiments of the present disclosure may also be implemented by providing a program for realizing one or more functions of the embodiments to a system or an apparatus and reading and executing the program by a computer disposed in the system or the apparatus.

Therefore, the program code itself installed in the computer in order to realize the process according to the embodiment is also one of the embodiments of the present disclosure. One or more functions of embodiments described above may be achieved by performing part or all of the process by an operating system or the like running on the computer in accordance with an instruction included in the program read by the computer.

A further embodiment may be realized by a combination of embodiments described above. Note that such a combination of embodiments falls into the scope of the present disclosure.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-175761 filed Oct. 27, 2021, which is hereby incorporated by reference herein in its entirety.

What is claimed is:

1. An information processing apparatus comprising:
    a setting unit configured to set one or more objects to be of interest among a plurality of objects as objects of interest;
    an image generation unit configured to generate a first image representing the objects of interest, a second image representing, as one object, objects other than the objects of interest among the plurality of objects, and a third image that is an image of at least part of the objects that are not the objects of interest among the plurality of objects and that are not included in the second image;
    a composition unit configured to compose the first image, the second image, and the third image; and
    an output unit configured to output a composed composite image.

2. The information processing apparatus according to claim 1, wherein the composition unit composes the first image and the second image by superimposing the first image and the second image in a predetermined display order.

3. The information processing apparatus according to claim 1, wherein the composition unit composes the first image and the second image such that a display mode is different between the first image and the second image.

4. The information processing apparatus according to claim 1, wherein the composition unit composes the first image and the second image such that a degree of transparency is different between the first image and the second image.

5. The information processing apparatus according to claim 1, wherein the objects of interest are a plurality of objects of interest among the plurality of objects.

6. The information processing apparatus according to claim 1, wherein the second image is an image representing, as one object, all objects other than the objects of interest among the plurality of objects.

7. The information processing apparatus according to claim 1, wherein the image generation unit generates the first image, the second image, and the third image as projection images from a certain viewpoint.

8. The information processing apparatus according to claim 1, wherein the image generation unit generates the first image and the second image as projection images from a certain viewpoint.

9. The information processing apparatus according to claim 1, further comprising an acquisition unit configured to acquire information indicating coordinates indicating a shape, a posture, and a position of an object,
    wherein the image generation unit is configured to generates the first image and the second image based on the acquired information.

10. The information processing apparatus according to claim 1, wherein the image generation unit receives a setting for a mode in which an object is displayed in an image to be generated.

11. The information processing apparatus according to claim 1, wherein the composition unit receives a setting for a mode of the composing.

12. The information processing apparatus according to claim 1, wherein the output unit performs outputting by displaying the composite image on a display unit.

13. The information processing apparatus according to claim 1, wherein the output unit outputs a file including the composite image.

14. The information processing apparatus according to claim 1, wherein
    the image generation unit is configured to
        generates a first three-dimensional moving image as the first image and a second three-dimensional moving image as the second image,
        generates a first projection moving image as a projection image of the first three-dimensional moving image from a first viewpoint, and
        generates a second projection moving image as a projection image of the second three-dimensional moving image from the first viewpoint.

15. The information processing apparatus according to claim 14, wherein the composition unit composes the first projection moving image with a first degree of transparency and the second projection moving image with a second degree of transparency.

16. The information processing apparatus according to claim 15, wherein a display unit displays the composed moving image.

17. An information processing method comprising:
    setting one or more objects to be of interest among a plurality of objects as objects of interest;
    generating a first image representing the objects of interest, a second image representing, as one object, objects other than the objects of interest among the plurality of objects, and a third image that is an image of at least part of the objects that are not the objects of interest among the plurality of objects and that are not included in the second image;
    composing the first image, the second image, and the third image; and
    outputting a composed composite image.

18. A non-transitory computer readable storage medium storing instructions to cause a computer to execute an information processing method, the method comprising:
    setting one or more objects to be of interest among a plurality of objects as objects of interest;
    generating a first image representing the objects of interest, a second image representing, as one object, objects other than the objects of interest among the plurality of objects, and a third image that is an image of at least part of the objects that are not the objects of interest among the plurality of objects and that are not included in the second image;
    composing the first image, the second image, and the third image; and
    outputting a composed composite image.

* * * * *